Nov. 4, 1952   R. LAPSLEY   2,616,311
TRANSMISSION
Filed Nov. 21, 1950
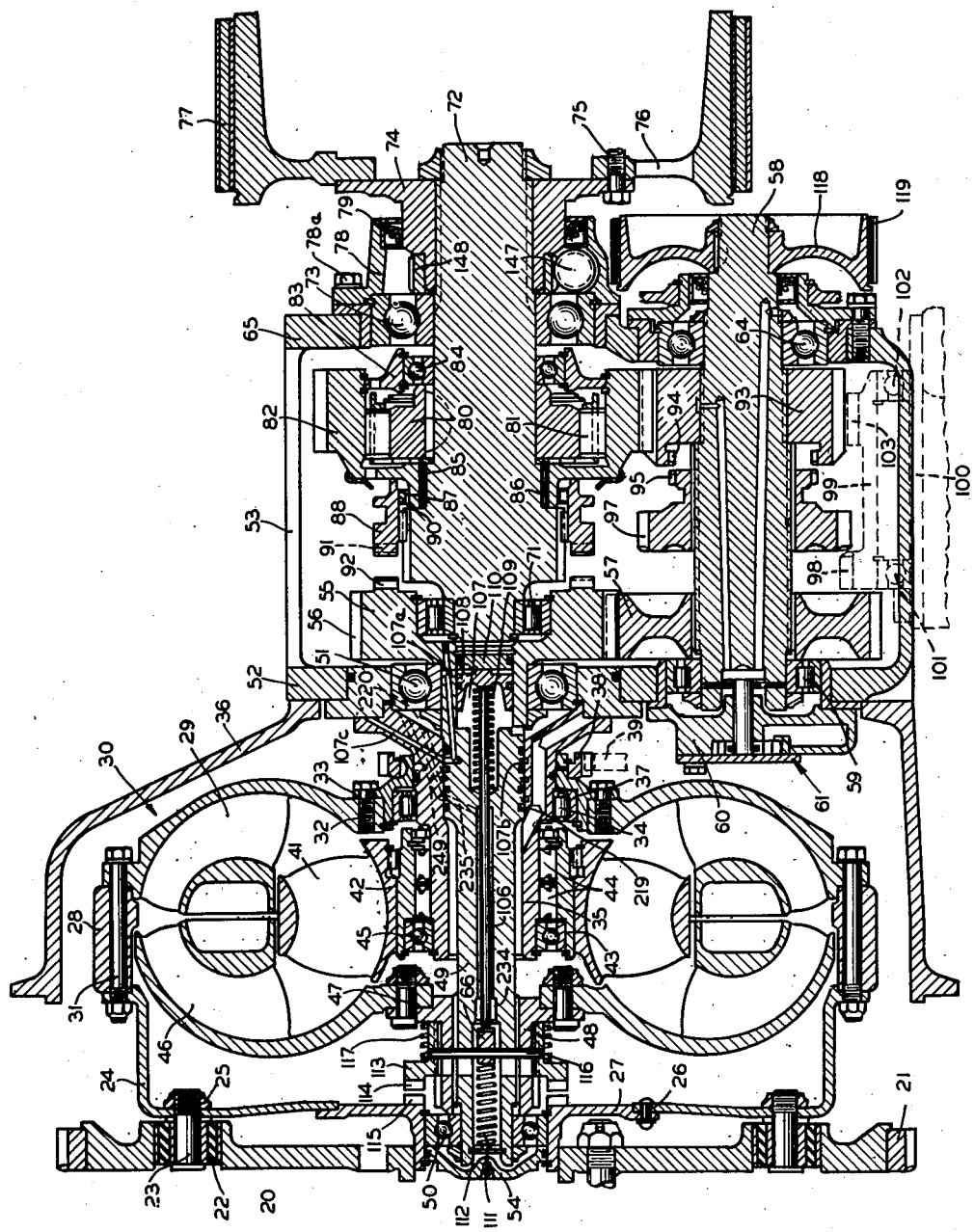
INVENTOR.
ROBERT LAPSLEY
BY Brown, Jackson,
Boettcher & Dienner
ATTYS.

Patented Nov. 4, 1952

2,616,311

UNITED STATES PATENT OFFICE 2,616,311

TRANSMISSION

Robert Lapsley, Buchanan, Mich., assignor to Clark Equipment Company, Buchanan, Mich., a corporation of Michigan Application November 21, 1950, Serial No. 196,876

4 Claims. (Cl. 74—730)

My invention relates generally to transmissions, and, more specifically, is directed to a brake construction for a transmission.

I am aware of numerous forms of drive mechanisms for self propelled vehicles: One form of such drive mechanism which is gaining favor with vehicle engineers, comprises a prime mover operatively connected through a fluid torque converter, to a transmission assembly having change speed gearing. The transmission assembly is in turn suitably connected to the drive wheels of the vehicle. In the operation of the drive mechanism, when the prime mover is idling, the pump or drive element of the fluid torque converter is caused to rotate slowly which tends to effect slow rotation of the driven element or turbine. As a consequence of slow rotation of the turbine element, the vehicle has a tendency to "creep". In order to eliminate "creep" of the vehicle, various brake constructions have been incorporated with the shaft interconnecting the turbine element of the fluid torque converter and the input shaft of the transmission assembly.

Brake constructions of the character noted are either disposed within the transmission housing or the fluid torque converter housing, and, as a result, access cannot be had to the brake construction unless the transmission assembly is disassembled from the vehicle.

It is an object of my present invention to provide a brake construction for braking the turbine element of a fluid torque converter which brake construction is mounted exteriorly both of the fluid torque converter housing and the transmission housing, in order that access may be had to the brake construction when the transmission is in assembled position.

Accessibility to the brake constructions when the transmission is in assembled position is highly desirable in order that adjustments thereon may be easily made, or brake linings renewed.

The aforementioned object of my present invention is accomplished by providing the transmission assembly with a countershaft which, at one end, extends outwardly of the transmission housing. The brake construction is mounted on the one end of the countershaft exteriorly of the transmission housing and thus access may be had readily thereto. A gear is fixed on the countershaft and has meshing engagement with a gear fixed on the shaft upon which the turbine element is secured, thus providing a driving connection between the turbine element and the countershaft of the transmission.

Now in order to acquaint those skilled in the art with the manner of constructing and using the device of my present invention, I shall describe in connection with the accompanying drawing a preferred embodiment of my invention.

In the drawing:

The single figure is a horizontal sectional view through a transmission embodying the brake construction of my present invention, showing the countershaft rotated approximately 110° from its normal position.

Referring now to the drawing, there is shown a flywheel 20 which is suitably connected to a prime mover, as, for example, an internal combustion engine (not shown). The outer periphery of the engine flywheel 20 is provided with an external ring gear 21 which is adapted to have meshing engagement with a conventional starter motor (not shown). Disposed in circumferentially spaced openings formed in the flywheel 20 are a plurality of resilient bushing members 22 which are adapted to provide support for a plurality of stud members 23. Secured to the one end of the stud members 23, by means of a plurality of nuts 25, is the radially extending portion of a closure member 24. The radially extending portion of the closure member 24 is secured, as by a plurality of rivets 26, to a hub member 27 suitably piloted in a central opening formed in the engine flywheel 20. The outer end of the axially extending portion of the closure member 24 is disposed in juxtaposition of the one side of a peripheral annular flange member 28, which flange 28, at its other side, engages the outer periphery of the pump or drive element 29 of a fluid torque converter, indicated generally by the reference numeral 30, disposed within a bell housing 36. The closure member 24, annular flange 28, and pump element 29 are secured together by means of a plurality of circumferentially spaced bolts 31, thus defining a housing for the torque converter 30. The pump element 29, at the central portion thereof, is secured, by means of a plurality of circumferentially spaced bolts 32, to a hub member 33, mounted to an annular race member 37 which is journaled, by means of a plurality of rollers 34, on the intermediate portion of a stepped sleeve member 35 fixedly mounted to the forward end wall 52 of a transmission housing 53. From the foregoing description, it will be realized that the engine flywheel 20, closure member 24, and pump element 29 are adapted to rotate as a unit.

Mounted to the hub member 33, supporting the pump element 29, is an external ring gear 38 which has meshing engagement with a gear 39 provided for driving a fluid pump (not shown) which is provided for circulating fluid to the fluid torque converter 30.

The torque converter 30 also comprises a reaction member 41 having a hub portion 42 keyed to a sleeve member 43 which is mounted upon one way brake members 44. The one way brake members 44 are mounted on the reduced end portion of the stepped sleeve member 35 and permit the reaction member 41 to rotate in one direction only. A ball bearing assembly 45 is also provided for rotatably supporting the sleeve member 43 on the reduced end portion of the stepped sleeve member 35.

The torque converter 30 further comprises a turbine or driven element 46 suitably secured, as by a plurality of circumferentially spaced bolts 47, to the radial flange portion of a hub or sleeve member 48. The hub or sleeve member 48 is mounted on the splined end of a shaft 49 which, at its forward end, is journaled within a ball bearing assembly 50 mounted within the hub member 27 secured to the closure member 24. The shaft 49, at its other end, is journaled within the stepped sleeve member 35 and within a ball bearing assembly 51 mounted in the forward end wall 52 of the transmission housing 53. The forward end of the shaft 49 is enclosed by a closure member 54 suitably secured to the inner periphery of the hub member 27.

The rear end of the shaft 49 has an upset end portion 55 which is disposed within the transmission housing 53. The outer periphery of the enlarged end 55 is formed with a plurality of gear teeth 56 which have constant meshing engagement with the teeth of a gear 57 fixed to the forward end of a countershaft 58. The countershaft 58 is rotatably journaled adjacent its forward end in a roller bearing assembly 59, mounted in the forward end wall 52 of the transmission housing 53. The forward end of the countershaft 58 is enclosed by a cap member 60 which carries a small oil pump, indicated generally by the reference numeral 61, driven by the countershaft 58 through a pin member 62 received in the recessed end of the countershaft 58. The member 62 has a slot at its inner end in which is disposed a transverse pin 63 mounted, at its ends, within the countershaft 58. The rear end of the countershaft 58 is rotatably supported in a ball bearing assembly 64 mounted in the rear end wall 65 of the transmission housing 53. The countershaft 58 is formed with a reduced rear end portion which projects outwardly of the rear end wall 65 and has secured thereon a brake drum 118. Associated with the brake drum 118 is a brake band 119 which is provided for selectively braking the drum 118 and the countershaft 58, which in turn effects braking of the driven element 46 of the fluid torque converter through gear 57, gear portion 55, and shaft 49. When the prime mover connected to the flywheel 20, is idling, the brake band 119 may be applied to the brake drum 118 for preventing "creep" of the vehicle with which the present drive means is embodied. From the foregoing description it will be realized that, since the brake drum 118 and brake band 119 are mounted exteriorly of the transmission housing 53, access may be had easily thereto for adjusting or relining the brake band 119 while the transmission is in assembled position.

The upset end of the shaft 49 has a central recessed portion in which is disposed a roller bearing assembly 71, which is adapted to rotatably support the forward reduced end portion of a transmission output shaft 72. The output shaft 72 is supported intermediate its ends by means of a ball bearing assembly 73 mounted within the rear end wall 65 of the transmission housing 53. Mounted to the splined rear end of the output shaft 72, projecting outwardly of the rear end wall 65, is a flange member 74 which has secured at its outer periphery, by means of a plurality of circumferentially spaced bolts 75, a brake drum 76. Associated with the brake drum 76 is a brake band 77 which is provided for braking the drum 76 and the output shaft 72. Disposed about the output shaft 72 is a cap member 78 which is suitably secured, as by bolts 78a, to the rear end wall 65 of the transmission housing 53. An oil seal 79 is interposed between the inner periphery of the cap member 78 and the outer periphery of the flange member 74 for preventing any oil leakage therepast. Mounted on the reduced end portion of the flange 74, within the confines of cap member 78, is a gear 148, which drives a gear 147 operatively connected to a governor mechanism (not shown).

Keyed to the intermediate portion of the output shaft 72 is a hub member 80, upon the outer periphery of which is mounted a one way clutch member 81. Mounted upon the one way clutch 81 is a gear member 82. By providing the one way clutch 81 the gear 82 is clutched to the output shaft 72 upon relative rotation in one direction of the former, with respect to the latter. Upon relative rotation in the other direction of the gear 82, with respect to the output shaft 72, the former is freely rotatable on the latter. The gear 82 has associated therewith a radially inwardly extending circumferential flange portion 83 which is rotatably journaled upon a ball bearing assembly 84 mounted to the outer periphery of the output shaft 72. The gear 82 also has a radially inwardly extending circumferential flange portion 85 which is rotatably journaled, by means of a plurality of needle bearings 86, upon the output shaft 72. The radially inwardly extending flange portion 85 has formed at the central portion thereof an annular hub which carries a plurality of external clutch teeth 87. Mounted on the enlarged splined portion of the output shaft 72 is an axially shiftable clutch collar member 88. The clutch collar member 88 has internal clutch teeth 90 which are adapted to engage with the clutch teeth 87 of the gear member 82. The clutch collar member 88 is also provided with radial clutch teeth 91 which are adapted to engage with radial clutch teeth 92 formed on the rear end of gear member 55. Movement of the clutch collar member 88 is adapted to be effected by a shift fork (not shown).

It will thus be observed from the foregoing description that, when the clutch collar member 88 is shifted to the left, from the position shown in Figure 1, and the clutch teeth 91 are disposed in engagement with the clutch teeth 92, the gear 55 will be clutched to the output shaft 72, thus effecting a 1:1 drive between shafts 49 and 72. Likewise, when the clutch collar member 88 is shifted to the right, to the position shown in Figure 1, and the clutch teeth 90 are disposed in engagement with the clutch teeth 87, the gear 82 is clutched to the output shaft 72.

The gear 82 on the output shaft 72 is in constant meshing engagement with a gear 93, rotatably mounted upon the countershaft 58. The gear 93 is formed with internal clutch teeth 94 which are adapted to be engaged by external clutch teeth 95 formed on an axially shiftable clutch collar member 96, mounted on the intermediate splined portion of the countershaft 58 for movement therealong. The clutch collar member 96 is formed with an enlarged gear portion 97 which is adapted to have meshing engagement with the gear portion 98 of a compound gear 99 mounted on a lay shaft 100, by means of a pair of spaced ball bearing assemblies 101 and 102. The compound gear 99 has a gear portion 103 which is in constant meshing engagement with the gear 82 on the output shaft 72. For purposes of clarity, the lay shaft and compound gear 99 are shown revolved from their normal position. When the clutch collar member 96 is shifted to the right, as viewed in Figure 1, so that the clutch teeth 95 are disposed in engagement with the clutch teeth 94 of the gear 93 on the countershaft 58, the countershaft 58 and output shaft 72 rotate in opposite directions. When the clutch collar member 96 is shifted to the left, as viewed in Figure 1, so that the gear portion 97 is disposed in engagement with the gear portion 98 of the compound gear 99 on the lay shaft 100, the countershaft 58 and the output shaft 72 rotate in the same direction. In the first described position of the clutch collar member 96, that is, to the right, the output shaft 72 is adapted to rotate in the same direcion as the engine flywheel 20, whereas when the clutch collar member 96 is shifted to the second described position, that is, to the left, the output shaft 72 is adapted to rotate in the opposite direction as the engine flywheel 20.

When the clutch collar member 96 is shifted to the right, so that the clutch teeth 95 thereon engage the clutch teeth 94 of gear 93, high ratio drive in a forward direction is imparted to gear 82 from gear 55, through gears 57 and 93. The gear 82 when rotating in a forward direction, with respect to the output shaft 72, drives the latter through the aforedescribed one way clutch 81. It will be noted that with the provision of the one way clutch 81 the gear 82 is adapted to drive the output shaft 72 in a forward direction, even though the clutch collar member 88 may be in a neutral position.

When the clutch collar member 96 is shifted to the left, so that the gear portion 97 is disposed in engagement with the gear portion 98 of the compound gear 99, drive in a reverse direction is imparted to gear 82. Since the gear 82 when driven in a reverse drection, with respect to the output shaft 72, rotates freely on the latter the clutch teeth 90 on the clutch collar member 88 must be disposed in engagement with the clutch teeth 87 of gear 82 before drive is effected from the latter to the output shaft 72 in a reverse direction. When the clutch collar member 96 is shifted axially along the countershaft 58 the brake band 119 may be applied to the brake drum 118 for braking the latter and the countershaft 58, in order to prevent gear clash between gear portions 97 and 98 or clutch teeth 94 and 95.

When the clutch collar member 88 is shifted to the left so that the clutch teeth 91 are disposed in engagement with the clutch teeth 92 on gear 55, low ratio drive in a forward direction is imparted to the output shaft 72 from shaft 49. It will be realized that when the output shaft 72 is driven in low ratio drive the gear 82 rotates freely thereon.

The shaft 49, is formed with an axially extending opening therethrough, in which opening is disposed a rod member 106 having an enlarged forward fork end 66. The opening in the shaft 49 is enlarged at the rear end thereof and defines a chamber 107 in which is disposed a piston 108 adapted to be reciprocated therein. The piston 108 is secured to the rear end of the rod 106. A spring 109 is disposed within the opening in the shaft 49 and is adapted to normally bias the piston 108 and piston rod 106 to the right, as viewed in Figure 1. The rear end of the chamber 107 is enclosed by means of a suitable plug member 110. Fluid under pressure is adapted to be admitted to the chamber 107 between the piston 108 and the plug member 110 through a fluid passageway 107a formed in shaft 49. The passageway 107a opens radially into an annular groove 107b formed in the inner periphery of the stepped sleeve member 35. The groove 107b communicates with a fluid passageway 107c, into which passageway 107c fluid is adapted to be selectively admitted. Since the control system for selectively admitting fluid under pressure to the passageway 107c forms no part of my present invention, it is believed that a showing and description thereof is unnecessary.

Admission of fluid under pressure into the chamber 107 urges the piston 108 and piston rod 106 to the left, as viewed in Figure 1. Disposed in the forward end of the opening in the shaft 49 is a spring 111 which, at its rear end, engages the forward end 66 of the rod 106 and, at its forward end, engages a cap member 112 secured at its edges in the shaft 49. The spring 111 is provided for normally biasing the piston rod 106 and piston 108 to the right, thereby cooperating with the aforedescribed spring member 109 disposed at the rear end of the opening in the shaft 49.

Generally a light grade of oil is employed in the fluid torque converter, while a heavier grade of oil is employed in the hydraulic control system and for lubricating the transmission. In order to eliminate intermixing of the two grades of oil a plurality of axially spaced oil seals 219 are provided between the outer periphery of the rotatable shaft 49 and the inner periphery of the fixed sleeve member 35. Leakage of the heavier grade oil from the passageway 107c is returned to the transmission housing 53 through the passageway 220 and formed in the sleeve member 35, while leakage of the lighter grade oil past the oil seal 234, disposed about the forward end of rod 106, into the central opening in shaft 49 is returned to the torque converter housing through passageway 249 in sleeve member 35.

Mounted on the outer splined periphery of the hub member 48, which supports the turbine element 46, is a clutch collar member 113. The clutch collar member 113 is formed with a plurality of radially extending clutch teeth 114 which are adapted to engage a plurality of radially extending clutch teeth 115 formed on the hub portion 27 supporting the closure member 24. The clutch collar member 113 is adapted to slide axially along the splined portion of the hub member 48. Disposed between the arms of the fork member 66, at the forward end of the piston rod 106, is a transverse pin member 116. The ends of the pin member 116 are adapted to extend through an axially extending slot formed in the hub member 48 and shaft 49 and the ends thereof are secured in suitable openings formed in the clutch collar member 113. A spring 117 is disposed between the clutch collar members 113 and the hub member 48 for spring loading or cocking the clutch collar member 113. It will be understood that the force exerted by the springs 109 and 111 is greater than the force exerted by the spring 117.

When the clutch collar member 113 is in the position shown in Figure 1, and the flywheel 20 is rotating, drive is effected through the fluid torque converter 30 to the shaft 49 and hence to the transmission. When the clutch collar member 113 is shifted to the left from the position shown in Figure 1 and the clutch teeth 114 thereon are disposed in engagement with the clutch teeth 115 on the hub portion 47 direct drive is effected between the flywheel 20 and shaft 49. Engagement of clutch teeth 114 and 115 also locks the drive and driven elements 29 and 46 of the fluid torque converter 30 together, after which they rotate as a unit.

When fluid under pressure is admitted to the chamber 107, through passageway 107c, annular groove 107b and passageway 107a, the piston 108, and piston rod 106 are urged to the left from the position shown in Figure 1, which compresses spring 111 and permits the spring 117 to bias the clutch collar member 113 to the left thereby disposing the leading edges of clutch teeth 114 into contact with the leading edges of clutch teeth 115. The clutch teeth 114 slide over the clutch teeth 115 until synchronous speed is reached, whereupon the clutch teeth 114 are thrust into engagement with clutch teeth 115, by the loaded spring 117, effecting a direct drive connection between the flywheel 20 and the shaft 49.

When the fluid flow to the chamber 107 is interrupted the spring 109 and 111, spring load the piston rod 106, piston 108, and clutch collar member 113 thereby tending to urge the clutch collar member 113 to return to the position shown in Figure 1. Although the clutch collar member 113 is spring loaded for movement to the right, such movement will not take place as long as the flywheel 20 drives the shaft 49 due to the force exerted on the faces of teeth 114 by the faces of teeth 115. However, when the flywheel 20 and shaft 49 rotate at substantially synchronous speed the force exerted on teeth 114 by teeth 115 is reduced, and the clutch collar member 113 is thrust to the right to the position shown in Figure 1, by springs 109 and 111. Drive is then effected through the fluid torque converter 30.

For a more detailed showing and description of the direct drive lock-up, reference may be had to the copending application of Oscar H. Banker, Serial No. 178,656, filed August 10, 1950.

While I have shown and described what I believe to be a preferred embodiment of my invention, it will be understood that various modifications and rearrangements may be made therein without departing from the spirit and scope of my present invention.

I claim:

1. In a drive mechanism, the combination of a fluid torque converter having a driven element, a shaft, said driven element of said fluid torque converter being fixedly mounted to said shaft, a housing for enclosing said fluid torque converter, a transmission housing mounted to said fluid torque converter housing, said shaft extending into said transmission housing, a countershaft mounted in said transmission housing and having a constant driving connection with said shaft, and a brake construction disposed exteriorly of said transmission housing and having connection with said countershaft for providing for selective braking of the latter together with said driven element of said fluid torque converter.

2. In a drive mechanism, the combination of a fluid torque converter having a driven element, a shaft, said driven element of said fluid torque converter being fixedly mounted to said shaft, a housing for enclosing said fluid torque converter, a transmission housing mounted to said fluid torque converter housing, said shaft extending into said transmission housing, a countershaft mounted in said transmission housing and extending outwardly at one end thereof, said countershaft having a constant driving connection with said shaft, and a brake construction mounted on the end of said countershaft extending outwardly of said transmission housing for providing for selective braking of said countershaft together with said driven element of said fluid torque converter.

3. In a drive mechanism, the combination of a fluid torque converter having a driven element, a shaft, said driven element of said fluid torque converter being fixedly mounted to said shaft, a housing for enclosing said fluid torque converter, a transmission housing mounted to said fluid torque converter housing, said shaft extending into said transmission housing, a countershaft mounted in said transmission housing and extending outwardly at one end thereof, a gear fixed on said countershaft within said transmission housing, a gear fixed on the end of said shaft extending into said transmission housing and having constant meshing engagement with said gear on said countershaft, and a brake construction mounted on the end of said countershaft extending outwardly of said transmission housing for providing for selective braking of said countershaft together with said driven element of said fluid torque converter.

4. In a drive mechanism, the combination of a fluid torque converter having a driven element, a first shaft, said driven element of said fluid torque converter being fixedly mounted to said first shaft, a housing for enclosing said fluid torque converter, a transmission housing mounted to said fluid torque converter housing, said first shaft extending into said transmission housing, a countershaft mounted in said transmission housing and extending outwardly at one end thereof, a gear fixed on said countershaft within said transmission housing, a gear fixed on the end of said first shaft extending into said transmission housing and having constant meshing engagement with said gear on said countershaft, an output shaft in said transmission housing, change speed gearing between said first shaft, said countershaft, and said output shaft for providing a plurality of drive ratios between said first shaft and said output shaft, and a brake construction mounted on the end of said countershaft extending outwardly of said transmission housing for providing for selective braking of said countershaft together with said driven element of said fluid torque converter irrespective of the drive ratio between said first shaft and said output shaft.

ROBERT LAPSLEY.

REFERENCES CITED

The following references are of record in the file of this patent:

UNITED STATES PATENTS

| Number | Name | Date |
|---|---|---|
| 1,667,565 | Radcliffe | Apr. 24, 1928 |
| 2,021,508 | Harrison et al. | Nov. 19, 1935 |
| 2,076,362 | Boldt et al. | Apr. 6, 1937 |
| 2,480,938 | Lapsley | Sept. 6, 1949 |